United States Patent
Suzuki et al.

(10) Patent No.: US 6,698,311 B2
(45) Date of Patent: Mar. 2, 2004

(54) STEERING WHEEL

(75) Inventors: Keizo Suzuki, Aichi-ken (JP); Hiroki Mori, Aichi-ken (JP); Hisao Yamada, Aichi-ken (JP); Toshio Uka, Kochi-prefecture (JP)

(73) Assignees: Kabushiki Kaisha Tokai-Roka-Denki-Seisakusho, Niwa-gun (JP); Miroku Techno-Wood Corporation, Kochi-prefecture (JP)

( * ) Notice: Subject to any disclaimer, the term of this patent is extended or adjusted under 35 U.S.C. 154(b) by 39 days.

(21) Appl. No.: 09/899,563

(22) Filed: Jul. 6, 2001

(65) Prior Publication Data

US 2002/0005082 A1 Jan. 17, 2002

(30) Foreign Application Priority Data

Jul. 10, 2000 (JP) ........................ 2000-209126
Sep. 5, 2000 (JP) ........................ 2000-269026

(51) Int. Cl.[7] ............................................. B62D 1/04
(52) U.S. Cl. ............................................ 74/552; 74/558
(58) Field of Search .................................. 74/552, 558

(56) References Cited

U.S. PATENT DOCUMENTS

| | | | | | |
|---|---|---|---|---|---|
| 1,088,999 | A | * | 3/1914 | Kormendy | 74/552 |
| 3,331,260 | A | * | 7/1967 | Zeller | 74/552 |
| 6,038,770 | A | * | 3/2000 | Carrier | 29/894.1 |
| 6,138,526 | A | * | 10/2000 | Mori | 74/552 |
| 6,249,970 | B1 | * | 6/2001 | Cattaneo | 156/297 |
| 6,282,982 | B1 | * | 9/2001 | Testa | 74/552 |
| 6,360,632 | B1 | * | 3/2002 | Papandreou | 74/552 |

FOREIGN PATENT DOCUMENTS

| | | | | |
|---|---|---|---|---|
| GB | 2142299 | * | 1/1985 | B62D/1/04 |
| JP | 61-36055 | * | 2/1986 | B62D/1/04 |
| JP | 62-71755 | * | 4/1987 | B62D/1/06 |
| JP | 63-270279 | * | 11/1988 | B62D/1/04 |

* cited by examiner

Primary Examiner—Thomas R. Hannon
Assistant Examiner—Vicky A. Johnson
(74) Attorney, Agent, or Firm—Nixon Peabody, LLP (57) ABSTRACT

In order to provide a steering wheel in which the strength of a wooden member is enhanced and the appearance of the wooden member is improved, a steering wheel comprising: a substantially annular metal core; and a wooden member comprising a plurality of wooden pieces, the wooden pieces being formed from a pure wooden material and bonded together to surround a part or the whole of the metal core when mounted on the metal core; wherein the wooden pieces are formed from a single pure wooden material, and the wooden pieces that are bonded together are formed from adjacent sites of the single pure wooden material, is provided.

4 Claims, 9 Drawing Sheets

LEFT AND RIGHT DIRECTION

LEFT AND RIGHT DIRECTION

FIG. 6

LEFT AND RIGHT DIRECTION

FIG. 7

LEFT AND RIGHT DIRECTION

FIG. 8

LEFT AND RIGHT DIRECTION

FIG. 9

STEERING WHEEL

BACKGROUND OF THE INVENTION

1. Field of the Invention

The present invention relates to a steering wheel in which a wooden member is mounted on a metal core.

2. Description of the Related Art

A steering wheel for a vehicle has, for example, a boss which is fixed to a steering shaft. The boss is connected via spokes to an annular metal core. Wooden members are mounted on areas of the metal core for the purpose of decoration and the like. The wooden member is formed by a pair of wooden pieces made of so-called laminated wood. One of the pair of wooden pieces is disposed at the front side of the steering wheel and the other is disposed at the back side of the steering wheel.

The pair of wooden pieces are bonded with (adhered to) each other so that the wooden member is mounted on the metal core to surround the metal core.

In such a steering wheel, however, warping of the wooden pieces may be caused by changes in temperature or changes in the amount of moisture (or dryness) in the wooden member. Since the degree of warping of each wooden piece is mutually different, load is applied to the area at which the wooden pieces are bonded together. As a result, there is a possibility that the pair of wooden pieces may partially separate from each other.

In addition, in a case in which the wooden member is mounted where the metal core is connected to the spoke, it is necessary to form an insertion hole in the wooden member to insert the spoke therein. As a result, there is a possibility that the strength of the wooden member in the region around the insertion hole may be lowered.

Further, a problem arises in that, the more the wooden member is disposed with its grain extending in the radial direction of the metal core, the lower the elasticity of the wooden member becomes.

Furthermore, at a vicinity of the surface at which the wooden pieces of the wooden member are bonded together, there is a problem in that the grain of each wooden piece may be misaligned, or the woodgrain pattern and color of the wooden member suddenly change, and the appearance of the wooden member is compromised.

When a plurality of wooden members is respectively mounted at a plurality of areas on the metal core, unless the woodgrain pattern and color of the wooden member are integrated, the appearance of the whole steering wheel will be compromised.

SUMMARY OF THE INVENTION

In view of the aforementioned facts, an object of the present invention is to provide a steering wheel in which the strength of a wooden member is enhanced and the appearance of the wooden member is improved.

A first aspect of the present invention is a steering wheel comprising: a substantially annular metal core; and a wooden member comprising a plurality of wooden pieces, the wooden pieces being formed from a pure wooden material and bonded together to surround a part or the whole of the metal core when mounted on the metal core; wherein the wooden pieces are formed from a single pure wooden material, and the wooden pieces that are bonded together are formed from adjacent sites of the single pure wooden material.

In the steering wheel relating to the first aspect of the present invention, a plurality of wooden pieces forming a wooden member are bonded together so that the wooden member is mounted on the metal core to surround a part of or the whole of the metal core.

In this steering wheel, the plurality of wooden pieces are formed from a single pure wooden material (a wooden material to which, after natural wood is cut and processed to be a predetermined shape, special processing (for example, laminating and the like) is not administered), and the wooden pieces which are bonded together are formed from adjacent sites of the pure wooden material. Therefore, the degree of warping of each wooden piece caused by changes in temperature or changes in the amount of moisture (or dryness) in the wooden member is made uniform between the wooden pieces bonded together. As a result, even if the wooden pieces warp, because they wrap in the same way, separation of a plurality of wooden pieces can be prevented due to separation load, which separates the wooden pieces, applied to the surface at which the wooden pieces are bonded together not being applied. Thus, the strength of the wooden member can be enhanced.

In addition, since the wooden pieces which are bonded together are formed from adjacent sites of the pure wooden material, misalignment of the grain of the wooden pieces, abrupt changes in the color and wood-grain pattern of the wooden member, is prevented from occurring at the bonding surface at which the wooden pieces are bonded together. Therefore, the appearance of the wooden member can be improved.

A second aspect of the present invention is a steering wheel comprising: a substantially annular metal core; and a plurality of wooden members, the wooden members being formed from a single pure wooden material and mounted on a plurality of areas of the metal core.

In the steering wheel relating to the second aspect of the present invention, a plurality of wooden members are respectively mounted on a plurality of areas of the metal core, and each the wooden member surrounds a part of or the whole of the metal core.

In this steering wheel, since the plurality of wooden members are formed from a single, pure wooden material, the woodgrain pattern and color of the wooden member are integrated. Therefore, the appearance of the entire steering wheel can be improved.

A third aspect of the present invention is a steering wheel comprising: a substantially annular metal core, the metal core being mounted via at least one spoke to a boss, the boss being fixed to a steering shaft of a vehicle; and a wooden member formed from a wooden material, the wooden member being mounted on the metal core to surround a part of or the whole of the metal core, wherein thickness of the wooden member where the metal core is connected to the spoke is larger than a thickness of the rest of the wooden member.

In the steering wheel relating to the third aspect of the present invention, the boss, which is fixed to a steering shaft of a vehicle, is connected via spokes to an annular metal core, and the wooden member is mounted on the metal core to surround a part of or the whole of the metal core.

In this steering wheel, the thickness (in a metal core radius direction) of the wooden member at the area where the metal core is connected to the spoke is made larger than that of the rest of the wooden member. Therefore, the strength (the breaking strength against external forces) of the wooden member at the area where the metal core is connected to the spoke can be enhanced.

A fourth aspect of the present invention is the steering wheel according to any one of first to third aspects, wherein the wooden member is disposed such that the grain thereof extends vertically with respect to the radial direction of the metal core.

In the steering wheel relating the fourth aspect of the present invention, since the wooden member is disposed such that the grain thereof extends substantially vertically with respect to the radial direction of the metal core, the strength of the wooden member can further be enhanced.

A fifth aspect of the present invention is the steering wheel according to any one of first to fourth aspects, wherein the wooden members are disposed in a symmetrical manner relative to a vertical plane that extends through the center of the metal core in the longitudinal direction of the vehicle.

In the steering wheel relating to the fifth aspect of the present invention, the wooden members are disposed in a symmetrical manner relative to a vertical plane which extends through the center of the metal core in the longitudinal direction of the vehicle. Therefore, the weight of the wooden members disposed at the left side of the vertical plane is substantially equal to the weight of the wooden member disposed to the right side of the vertical plane. As a result, balance (steering performance) of the steering wheel in the direction of rotation thereof can be improved.

As the steering wheel relating to the second aspect of the present invention, in the case in which a plurality of wooden members are formed from a single, pure wooden material, the density of each wooden member is made uniform, and, therefore, balance (steering performance) of the steering wheel in the direction of rotation thereof can be particularly improved.

A sixth aspect of the present invention is the steering wheel according to the first aspect, wherein the plurality of wooden pieces are formed by the singular wooden material being cut at a cutting plane so as to form bonded planes thereof, and the plurality of wooden pieces are bonded together at respective bonded planes.

In the steering wheel relating to the sixth aspect of the present invention, the plurality of wooden pieces are formed by the singular wooden material being cut at the cutting plane so as to form bonded planes thereof, and the plurality of wooden pieces are bonded together at respective bonded planes. Therefore, with the wooden pieces, the degree of warping in each of the wooden pieces caused by changes in temperature or changes in the amount of moisture (or dryness) in the wooden members is made uniform (coincidence) between the wooden pieces. At the same time, misalignment of the grain of each wooden piece, changes in the color and wood-grain pattern of the wooden member, is prevented from occurring at the vicinity of the bonding surface at which the wooden pieces are bonded together.

BRIEF DESCRIPTION OF THE DRAWINGS

FIGS. 3A to 3D each show a wooden piece of the wooden member provided at an upper portion of the steering wheel relating to the first embodiment.

DESCRIPTION OF THE PREFERRED EMBODIMENTS

First Embodiment

Figure 1:
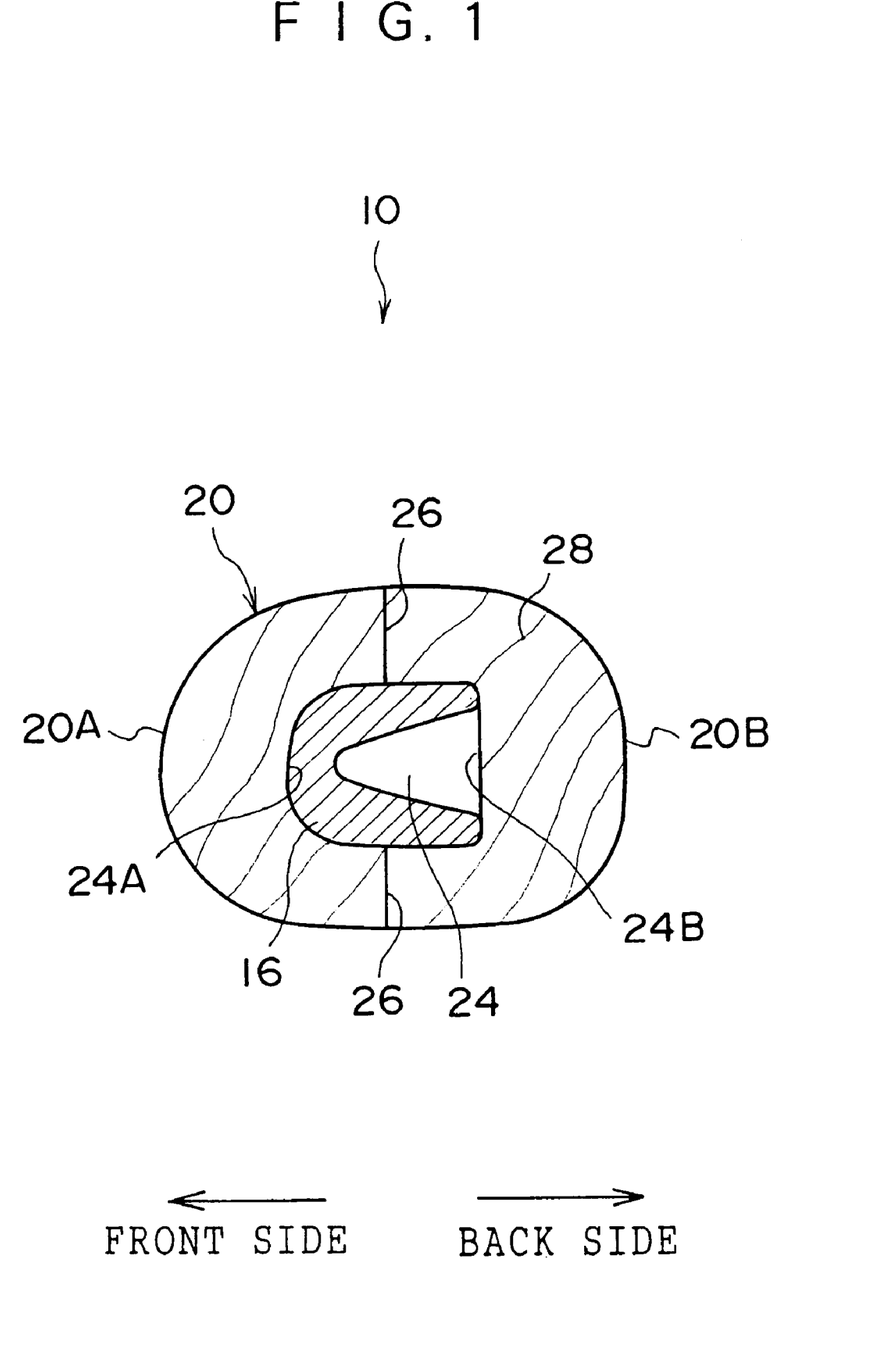
FIG. 1 is a cross-sectional view (taken along line 1—1 of FIG. 2) of main portions (a metal core and a wooden member) of a steering wheel relating to a first embodiment of the present invention.
Figure 2:
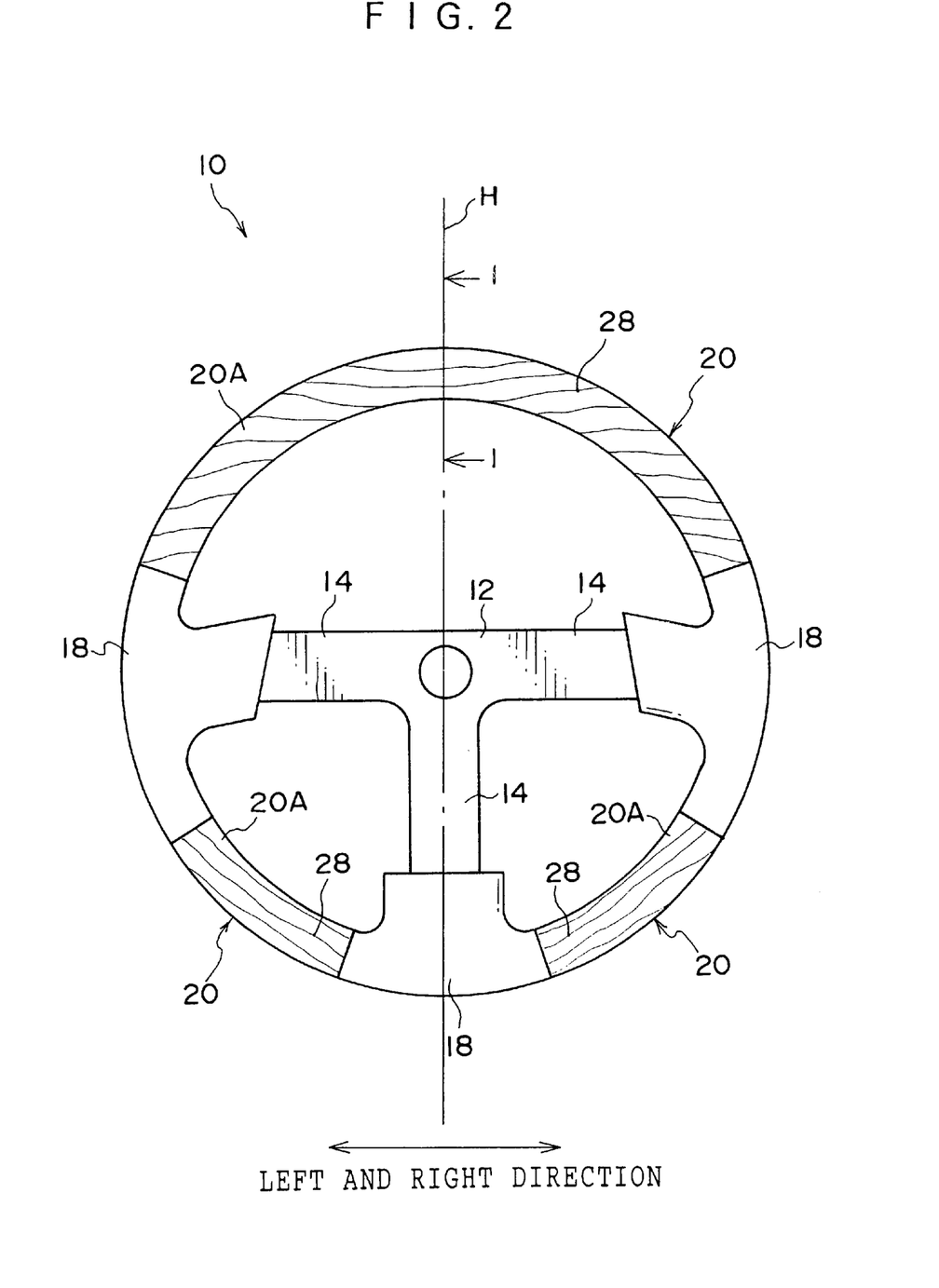
FIG. 2 is a plan view of the steering wheel relating to the first embodiment of the present invention.

FIG. 1 is a cross-sectional view (taken along line 1—1 of FIG. 2) of main portions of a steering wheel 10 relating to a first embodiment of the present invention and FIG. 2 is a plan view of the steering wheel 10.

The steering wheel 10 relating to the present embodiment has a boss 12 which is fixed to a steering shaft (not shown) of a vehicle. Ends of spokes 14 (three spokes in this embodiment) are connected to the boss 12. The spokes 14 extend downward, rightward, and leftward from the boss 12.

A metal core 16 made of, for example, magnesium, is connected to each end of spokes 14. The metal core 16 is annular in plan view and disposed facing the driver's seat (driver).

Leather-coated (leather-wound) portions 18 are provided at a lower area, a right-side area and a left-side area of the steering wheel 10. The leather-coated portion 18 is formed by coating (being wound) leather on a resin surface. Each the leather-coated portion 18 is mounted on the spoke 14 and the metal core 16 so as to surround the spoke 14 at the metal core 16 side thereof and the metal core 16. The leather-coated portion 18 may be formed without leather coated on the resin surface (i.e. may be formed only by resin).

Figure 3A:
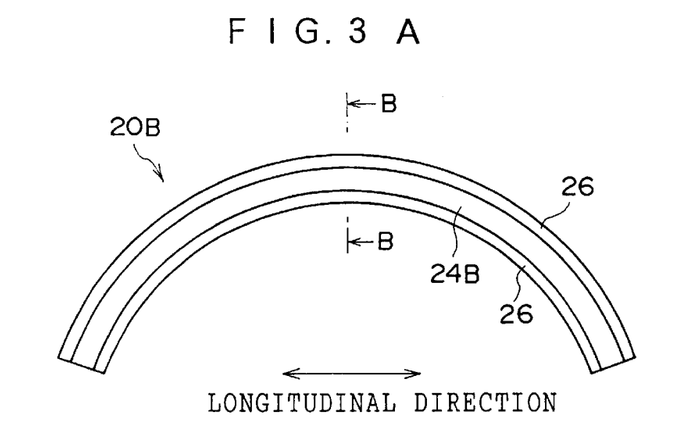
FIG. 3A is a back side view of a wooden piece disposed at the back side of the steering wheel.
Figure 3B:
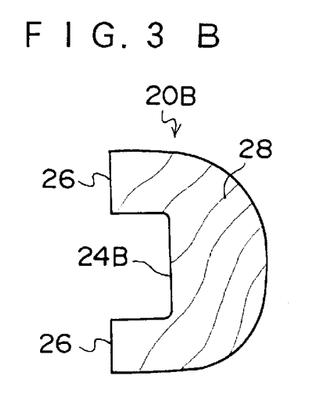
FIG. 3B is a cross-sectional view (taken along line B—B of FIG. 3A) of a wooden piece disposed at the back side of the steering wheel.
Figure 3C:
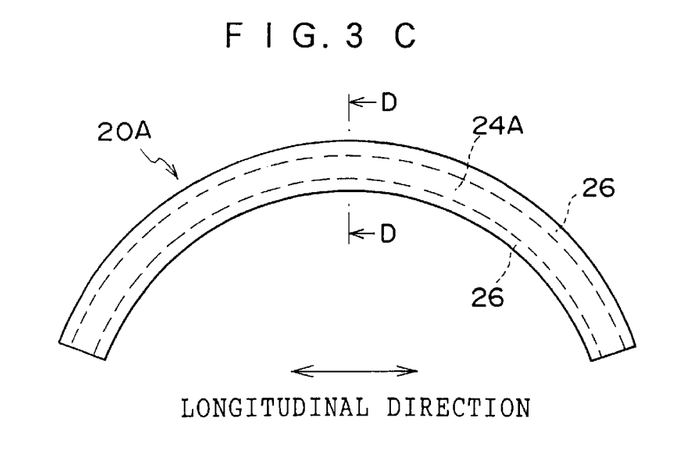
FIG. 3C is a plan view of a wooden piece disposed at the front side of the steering wheel.
Figure 3D:
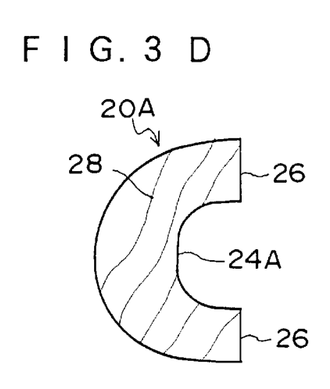
FIG. 3D is a cross-sectional view (taken along line D—D of FIG. 3C) of the wooden piece disposed at the front side of the steering wheel.

Wooden members 20 are provided at an upper area (including upper right and left areas) and at lower right and left areas of the steering wheel 10 for the purpose of decoration and the like. Each wooden member 20 is formed in a cylindrical shape and is bent in a circular manner. Each wooden member 20 is formed by a plurality (two in this embodiment) of wooden pieces (wooden pieces 20A and 20B). The wooden piece 20A (see FIGS. 3C and 3D, for example) is disposed at the front side of the steering wheel 10 and the wooden piece 20B (see FIGS. 3A and 3B, for example) is disposed at the back side of the steering wheel 10. Each wooden member has an internal fitting hole 24. The fitting hole 24 is formed by combining a cavity (a concave portion) 24A provided in the wooden piece 20A and a cavity (a concave portion)24B provided in the wooden piece 20B. By bonding the wooden pieces 20A and 20B together at bonding surfaces 26, the wooden member 20 is mounted on the metal core 16 to surround the metal core 16 (i.e., the metal core 16 is fitted in the fitting hole 24).

The wooden pieces 20A and 20B are formed from a single pure wooden material 22 (see FIGS. 4A and 4B, for example) of natural wood. The pure wooden material 22 is formed in a block shape and has a thickness equal to or larger than that of the wooden member 20. The grain 28 of the pure wooden material 22 extends substantially parallel to the longitudinal direction thereof. (The grain 28 of the pure wooden material 22 extends in a direction which direction coincides with a radius direction of the metal core.) When the wooden pieces 20A and 20B are formed from the pure wooden material 22, first, the pure wooden material 22 is divided at the cutting plane 30 in the thickness direction of the pure wooden material 22 to form divided materials 22A and 22B. Then, the wooden pieces 20A and 20B (including the cavities 24A and 24B) are formed respectively from the divided materials 22A and 22B through a chipping process, a sanding process, or the like.

Figure 4A:
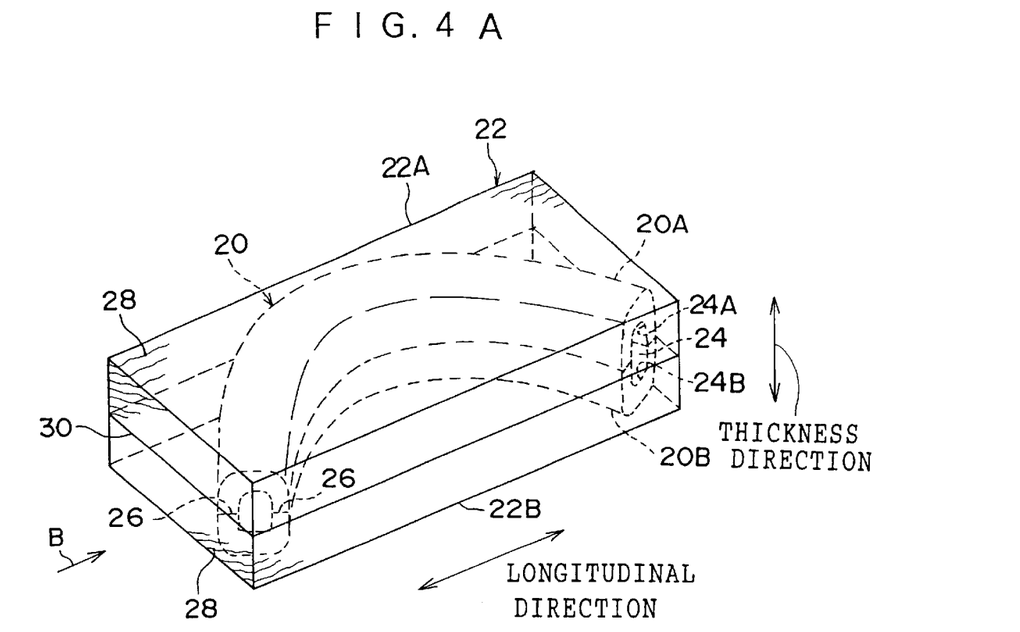
FIG. 4A is a perspective view illustrating a pure wooden material used to form a wooden member provided at the upper portion of the steering wheel relating to the first embodiment.
Figure 4B:
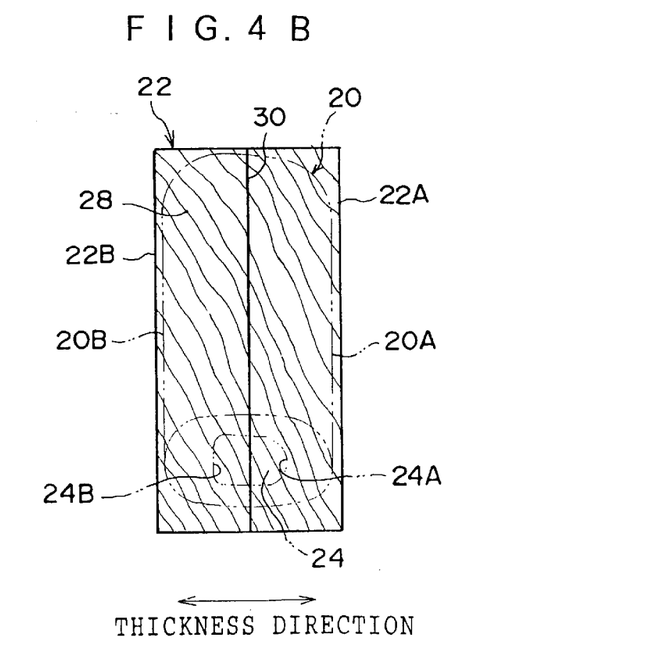
FIG. 4B is a side view (taken from the direction of arrow B in FIG. 4A) of the pure wooden material.

The wooden pieces 20A and 20B are formed from adjacent sites of the pure wooden material 22, which sites face each other with a cutting plane 30 interposed therebetween. The cutting plane 30 of the pure wooden material 22 becomes the bonding surfaces 26 of the wooden pieces 20A and 20B. With the wooden pieces 20A and 20B formed in the above way, the degree of warping in each of the wooden pieces 20A and 20B caused by changes in temperature or changes in the amount of moisture (or dryness) in the wooden members is made uniform (coincidence) between the wooden pieces 20A and 20B. At the same time, misalignment of the grain 28 of each wooden piece, changes in the color and wood-grain pattern of the wooden member 20, is prevented from occurring at the vicinity of the bonding surface 26 at which the wooden pieces 20A and 20B are bonded together.

Further, the longitudinal direction of each wooden piece 20A and 20B (see FIGS. 3A and 3C) is disposed parallel to the longitudinal direction of the pure wooden material 22 (see FIG. 4) so that the longitudinal direction of each wooden pieces 20A and 20B is disposed substantially parallel to the grain 28 direction of the pure wooden material 22. In this manner, the grain 28 of the wooden member 20 at the upper area of the metal core 16 is disposed substantially parallel with respect to a transverse direction of the vehicle, and is disposed substantially vertically with respect to the radial direction of the metal core 16. At the same time, the grain 28 of each wooden member 20 at the lower right and lower left areas of the metal core 16 are disposed substantially vertically with respect to the radial direction of the metal core 16.

Next, the operation of the present embodiment will be described.

In the steering wheel 10 structured as described above, by bonding (adhering) the wooden pieces 20A and 20B, which form each wooden member, together, each the wooden member 20 is mounted on the metal core 16 to surround the upper area and the lower right and lower left areas of the metal core 16.

In the steering wheel 10, the wooden pieces 20A and 20B which are bonded together are formed from adjacent sites of a single pure wooden material 22. Therefore, the degree of warping of each wooden piece 20A and 20B caused by changes in temperature or changes in the amount of moisture (or dryness) in the wooden member 20 is made uniform (same) between the wooden pieces 20A and 20B bonded together. As a result, even if the wooden pieces 20A and 20B warp, separation of the wooden pieces 20A and 20B from one another can be prevented because the wooden piece 20A and 20B wrap in the same way such that separation load between the wooden pieces 20A and 20B are not applied therebetween (to the bonded plane 26). Thus, the strength of the wooden member 20 can be enhanced.

Further, as described above, since the wooden pieces 20A and 20B which are bonded together are formed from adjacent sites of the pure wooden material 22, misalignment of the grain 28 of the wooden pieces 20A and 20B, abrupt changes in the color and wood-grain pattern of the wooden member 20, is prevented from occurring at the vicinity of the bonding surface 26 at which the wooden pieces 20A and 20B are bonded together. Therefore, the appearance of the wooden member 20 can be improved.

In addition, since the wooden member 20 is disposed such that the grain 28 thereof extends substantially vertically with respect to the radial direction of the metal core 16, the strength of the wooden member 20 can further be enhanced.

Furthermore, each wooden member 20 is mounted on the metal core 16 so as to surround the upper area and the lower right and lower left areas of the metal core 16, and the wooden members 20 are disposed in a symmetrical manner relative to a vertical plane H (see FIG. 2) which extends through the center (steering shaft) of the metal core 16 in the longitudinal direction of the vehicle. Therefore, the weight of the wooden members 20 disposed at the left side of the vertical plane H is substantially equal to the weight of the wooden members 20 disposed to the right side of the vertical plane H. As a result, balance (steering performance) of the steering wheel 10 in the direction of rotation thereof can be improved.

Second Embodiment

Figure 5:
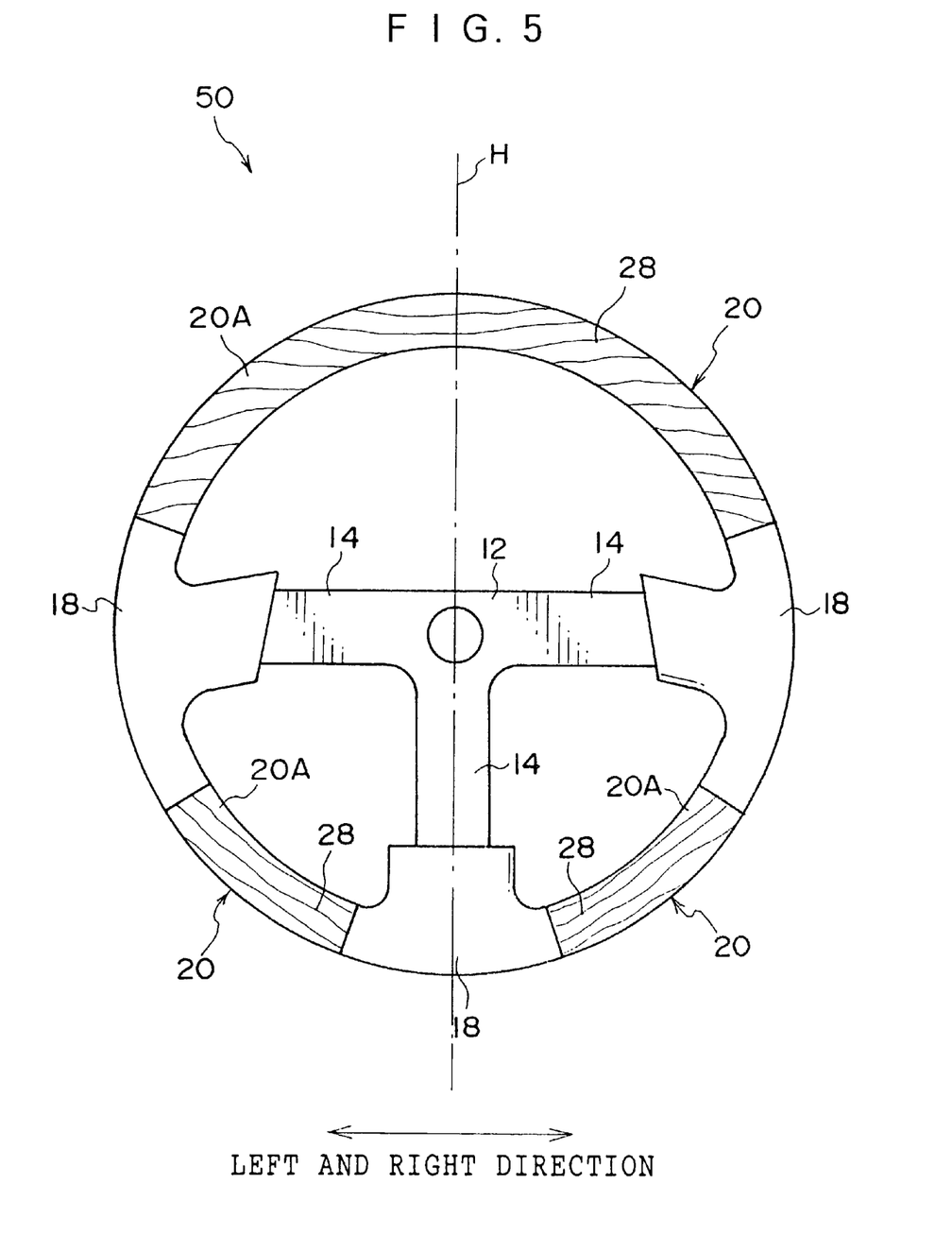
FIG. 5 is a plan view of a steering wheel relating to a second embodiment of the present invention.

FIG. 5 is a plan view of a steering wheel 50 relating to a second embodiment of the present invention.

The steering wheel 50 relating to the present embodiment is structured in the same manner as that of the above-described first embodiment except that the wooden members 20 (i.e., the wooden members disposed at the upper area and the lower right and lower left areas) of the steering wheel 50 are formed from a single pure wooden material (not shown) of natural wood.

The same operation and effect as those of the above-described first embodiment can be obtained in the steering wheel 50 relating to the present embodiment.

In this embodiment, since the wooden members 20 disposed at the upper area and lower right and lower left areas of the steering wheel 50 are formed from a single pure wooden material, the woodgrain pattern and color of the wooden members 20 are integrated, and, therefore, the appearance of the entire steering wheel 50 can be improved.

In addition, since each of the wooden members 20 is formed from a single pure wooden material, each density of the wooden members is made uniform. Also, the wooden members 20 are disposed in a symmetrical manner relative to a vertical plane H which extends through the center (steering shaft) of the metal core 16 in the longitudinal direction of the vehicle. In this manner, the weight of the wooden members 20 disposed at the left side of the vertical plane H is substantially equal to the weight of the wooden members 20 disposed to the right side of the vertical plane H. As a result, balance (steering performance) of the steering wheel 50 in the direction of rotation thereof can be improved.

First Modification of the Second Embodiment

Figure 6:
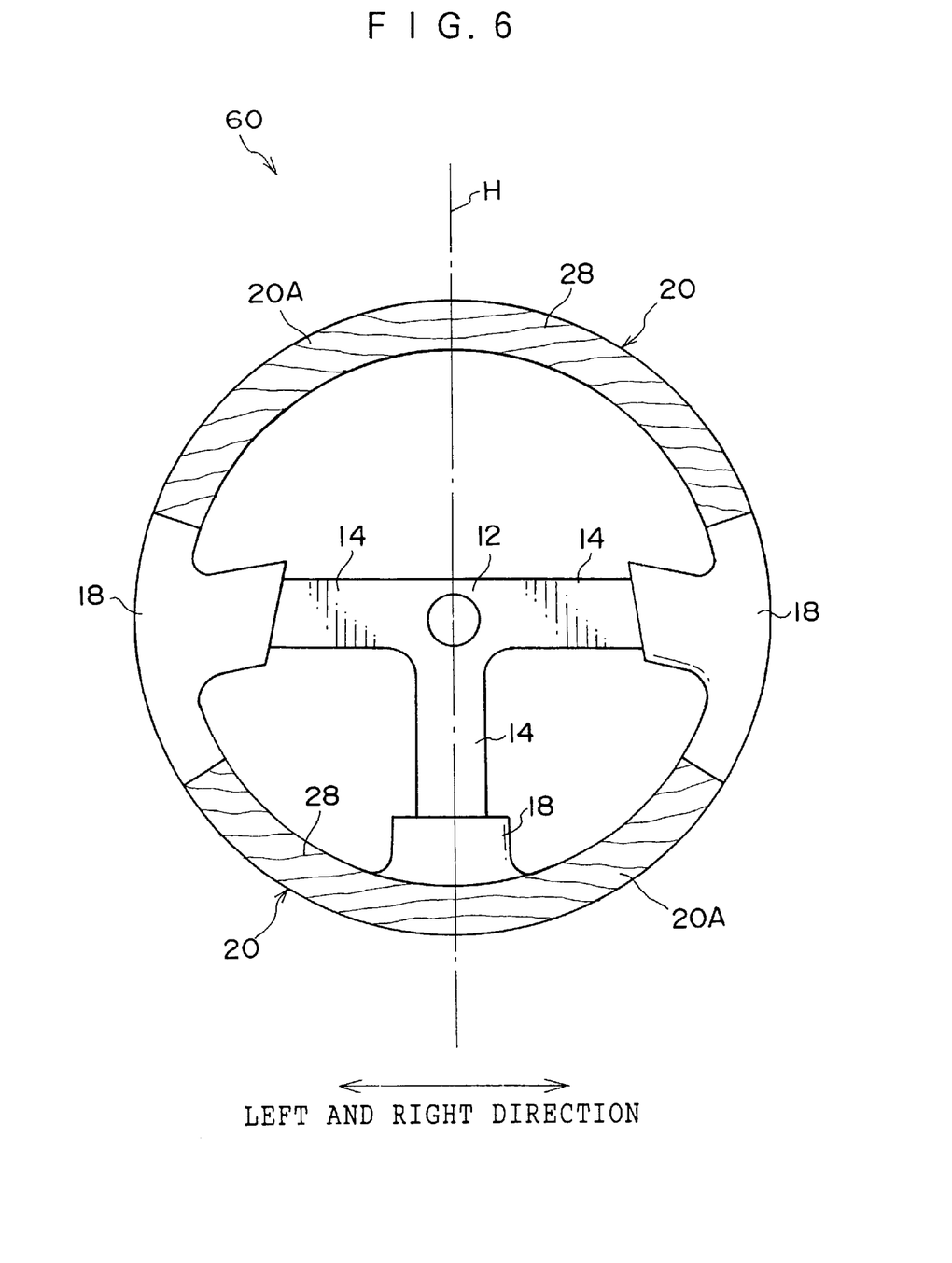
FIG. 6 is a plan view of a steering wheel relating to a first modification of the second embodiment.

FIG. 6 is a plan view of a steering wheel 60 relating to a first modification of the second embodiment.

The steering wheel 60 relating to the present modification is structured such that the leather-coated portion 18 disposed at the lower area of the steering wheel 60 only surrounds the spoke 14 at the metal core 16 side thereof, and does not surround the metal core 16.

In the steering wheel 60, the wooden member 20 is also provided at the lower area (including lower right and lower left areas) as well as the upper area of the steering wheel 60. Namely, the wooden member 20 exists at the area where the metal core 16 is not surrounded by the leather-coated portion 18. Namely, in the second embodiment described above, two wooden members 20 are provided at the lower area (the left lower area and the right lower area) of the steering wheel, however, in the present modification embodiment, single wooden member 20 is provided at the lower area of the steering wheel. The wooden members 20 are disposed in a symmetrical manner relative to a vertical plane H which extends through the center (steering shaft) of the metal core 16 in the longitudinal direction of the vehicle, and the plurality of wooden members 20 (wooden members disposed at the upper and lower areas of the steering wheel 60) are all formed from a single pure wooden material (not shown) of natural wood.

Other structures are the same as those described in the preceding second embodiment.

The same operation and effect as those of the above-described second embodiment can be obtained in the steering wheel 60 relating to the present modification.

Second Modification of the Second Embodiment

Figure 7:
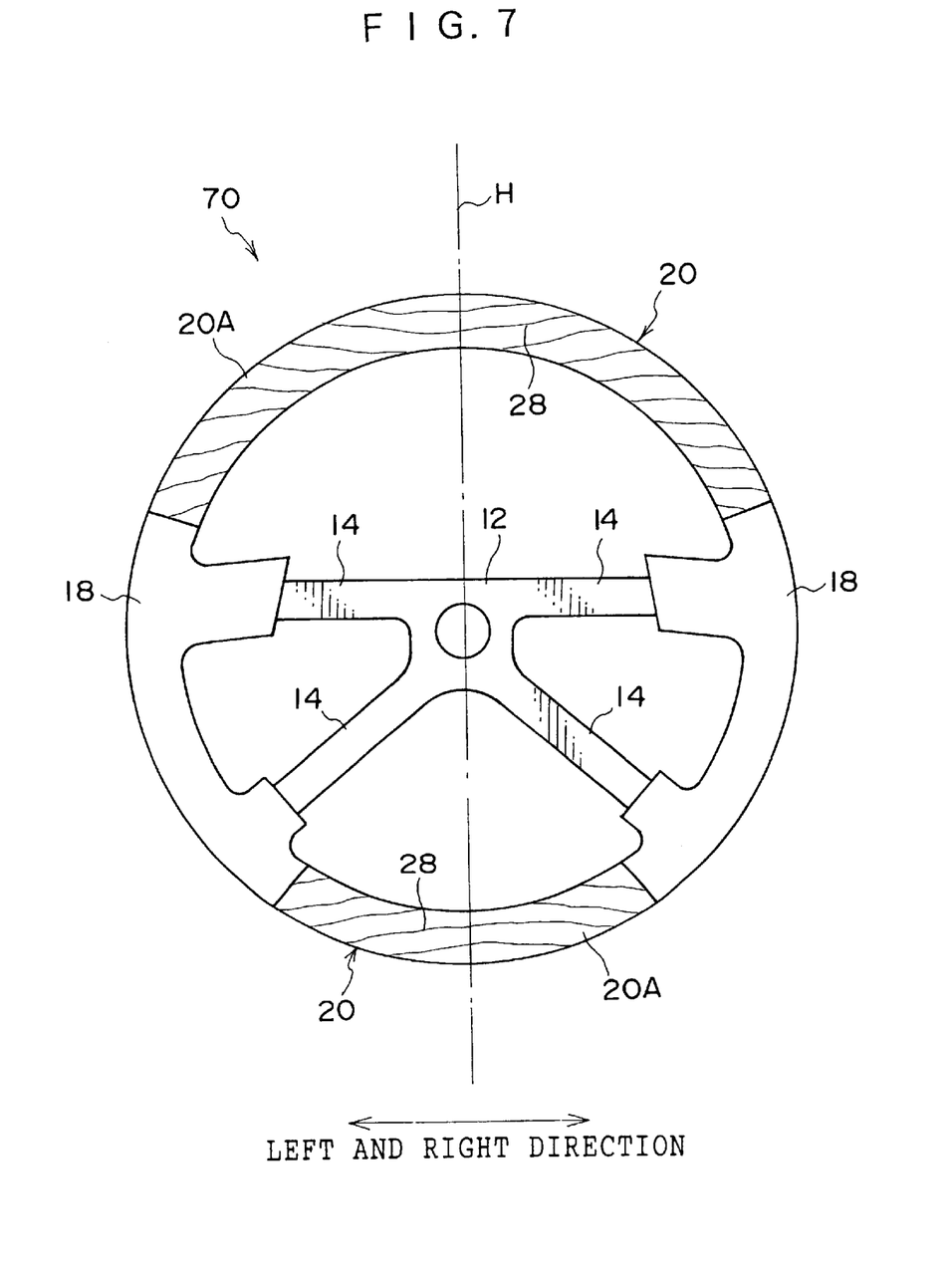
FIG. 7 is a plan view of a steering wheel relating to a second modification of the second embodiment.

FIG. 7 is a plan view of a steering wheel 70 relating to a second modification of the second embodiment.

In the steering wheel 70 relating to the present modified embodiment, base ends of the spokes 14 (four spokes in this modification) are provided continuously to the boss 12. The spokes 14 extend to the right, left, lower right, and lower left from the boss 12, and each distal end of the spoke 14 is connected to the metal core 16.

Leather-coated portions 18 are provided at the right side area and left side area of the steering wheel 70. The leather-coated portion 18 at the right side area is disposed so as to surround the spoke portions 14 that extend to the right and lower right from the boss 12, at the metal core 16 side thereof and the metal core 16. Similarly, the leather-coated portion 18 at the left side area is disposed so as to surround the spokes 14 that extend to the left and lower left from the boss 12, at the metal core 16 side thereof and the metal core 16.

In the steering wheel 70, the wooden members 20 are provided at the upper and lower areas. The wooden members 20 are disposed in a symmetrical manner relative to a vertical plane H which extends through the center (steering shaft) of the metal core 16 in the longitudinal direction of the vehicle, and all of the wooden members 20 (wooden members 20 disposed at the upper and lower areas) are formed from the same, single pure wooden material (not shown) of natural wood.

Other structures are the same as those described in the preceding second embodiment.

The same operation and effect as those of the above described second embodiment can be obtained in the steering wheel 70 relating to the present modification.

Third Embodiment

Figure 8:
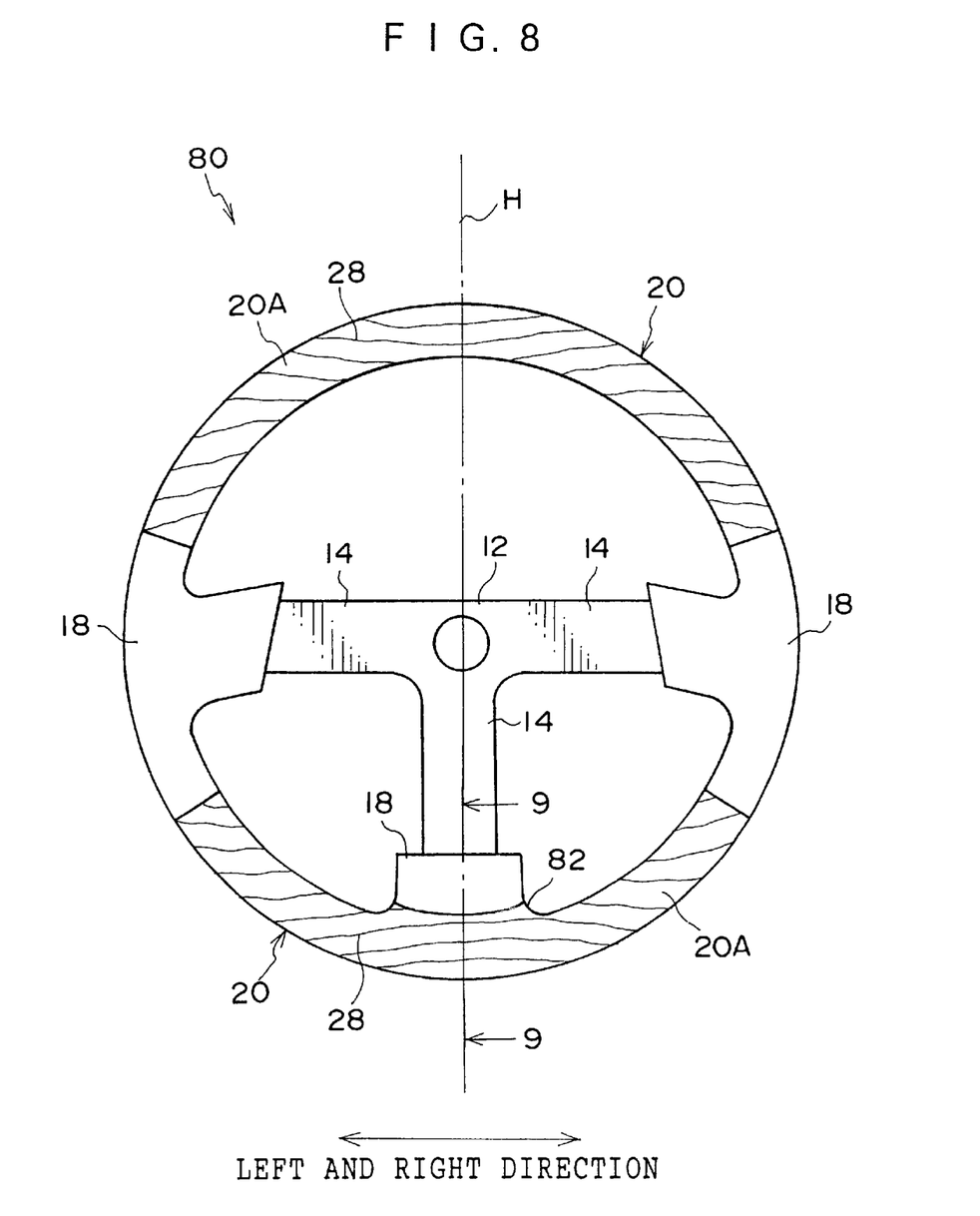
FIG. 8 is a plan view of a steering wheel relating to a third embodiment of the present invention.
Figure 9:
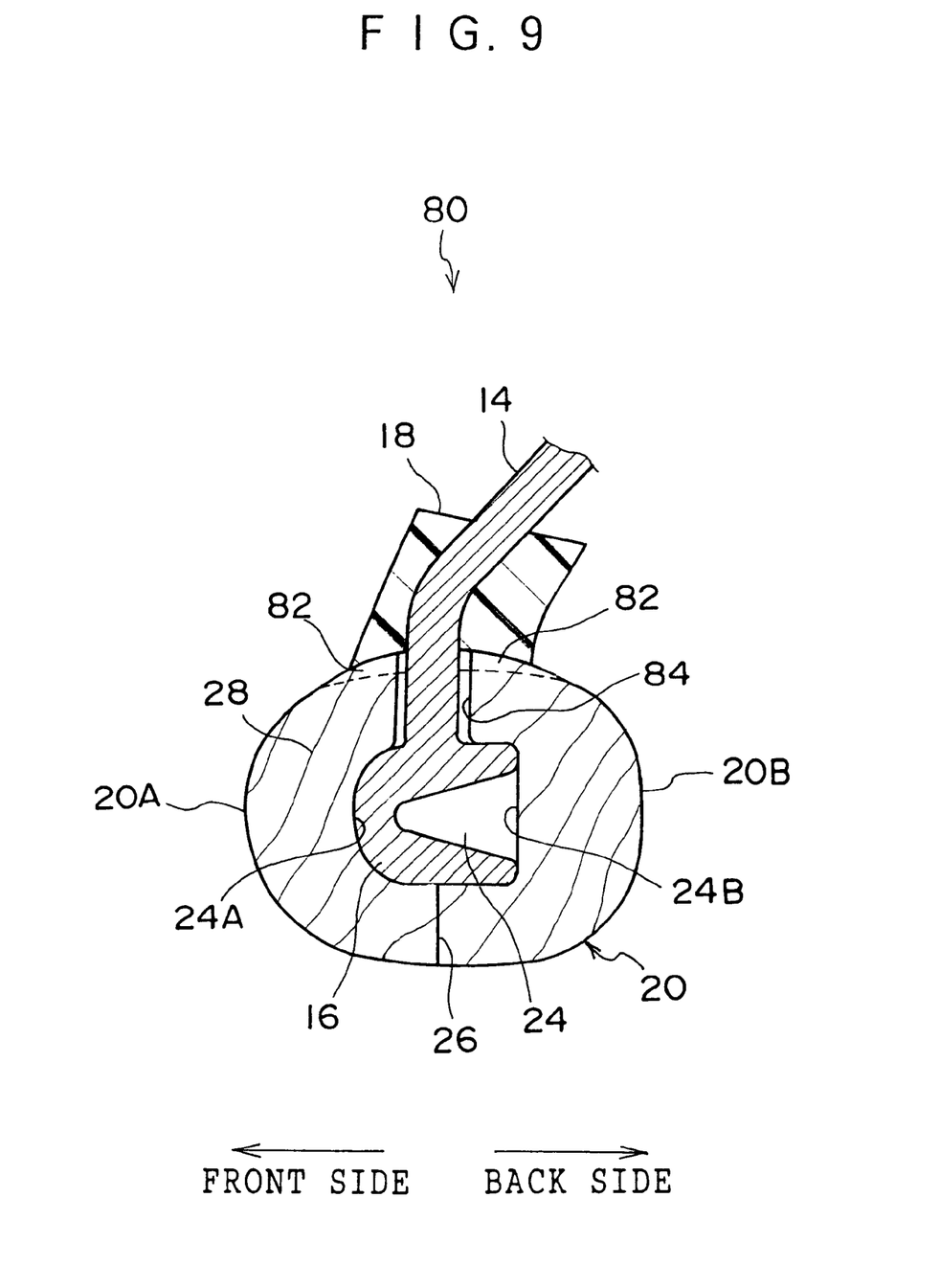
FIG. 9 is a cross-sectional view (taken along line 9—9 of FIG. 8) of main portions of the steering wheel relating to the third embodiment.

FIG. 8 is a plan view of a steering wheel 80 relating to a third embodiment of the present invention and FIG. 9 is a cross-sectional view (taken along line 9—9 of FIG. 8) of main portions of the steering wheel 80.

The steering wheel 80 relating to the present embodiment is structured in the same manner as that of the above-described first modification of the second embodiment except that the thickness (in a steering wheel radius direction) of the lower wooden member 20 at the portion where the metal core 16 is connected to the spoke 14 is larger than that of the rest of the lower wooden member 20 and the upper wooden member 20. Namely, the central portion of the lower wooden member 20 is made thicker by the thickness of a reinforcement 82 provided at the upper portion in FIG. 9, namely, provided at an inner steering wheel radius side, of the wooden member 20. The reinforcement 82 is disposed so as to surround the vicinity of the insertion hole 84 of the wooden member 20 in which the end of the spoke portion 14 is inserted.

The same operation and effect as those of the above-described second embodiment can be obtained in the steering wheel 80 relating to the present embodiment.

Further, the thickness of the central lower wooden member 20 at the portion where the metal core 16 is connected to the spoke 14 is made larger than that of the rest of the wooden member 20 by the thickness of the reinforcement 82. Therefore, the strength (breaking strength against external forces) of the wooden member 20 at the above-described portion where the metal core 16 is connected to the spoke 14 can be enhanced.

Though in the foregoing first embodiment, second embodiment (including the first and second modifications), and third embodiment, the wooden members 20 are provided at an upper area and lower right and lower left areas or a lower area of the steering wheel, the wooden member can be provided at any portion of the steering wheel. For example, the wooden member can be provided at the entire circumference of the steering wheel.

In addition, though in the foregoing first embodiment, second embodiment (including the first and second modifications) and third embodiment, the wooden member 20 is formed by two wooden pieces (wooden pieces 20A and 20B), three or more wooden pieces can also be used to form a wooden member 20.

In the steering wheel relating to the first aspect of the present invention, a plurality of wooden pieces are formed from a single pure wooden material, and the wooden pieces which are bonded together are formed from adjacent sites of the pure wooden material. As a result, even if the wooden pieces warp, because the wooden pieces warp in the same way, separation of the wooden pieces can be prevented due to separation load, which separates the wooden pieces, applied to the surface at which the wooden pieces are bonded together being prevent from occurring. Thus, the strength of the wooden member can be enhanced. In addition, misalignment of the grain 28 of the wooden pieces 20A and 20B, abrupt changes in the color and wood-grain pattern of the wooden member 20, is prevented from occurring at the bonding surface 26 at which the wooden pieces 20A and 20B are bonded together. Therefore, the appearance of the wooden member can be improved.

In the steering wheel relating to the second aspect of the present invention, since the wooden members are formed from a single pure wooden material, the woodgrain pattern and color of the wooden member are integrated. Therefore, the appearance of the entire steering wheel can be improved.

In the steering wheel relating to the third aspect of the present invention, the thickness of the wooden member at the portion where the metal core is connected to the spoke is larger than that of the rest of the wooden member. Therefore, the strength of the wooden member at the portion where the metal core is connected to the spoke can be enhanced.

In the steering wheel relating the fourth aspect of the present invention, since the wooden member is disposed such that its grain extends substantially vertically to the radial direction of the metal core, the strength of the wooden member can further be enhanced.

In the steering wheel relating to the fifth aspect of the present invention, the wooden members are disposed in a symmetrical manner relative to a vertical plane which extends through the center of the metal core in the longitudinal direction of the vehicle. Therefore, the weight of the wooden members 20 disposed at the left side of the vertical plane H is substantially equal to the weight of the wooden members 20 disposed to the right side of the vertical plane H. As a result, balance (steering performance) of the steering wheel in the direction of rotation thereof can particularly be improved. Particularly, When a plurality of wooden members are formed from a single pure wooden material, the density of the wooden member is made uniform, and, therefore, the balance of the steering wheel in the direction of rotation thereof can particularly be improved.

What is claimed is:

1. A steering wheel comprising:
   a substantially annular metal core, the metal core being mounted via at least one spoke to a boss, the boss being fixed to a steering shaft of a vehicle; and
   a wooden member formed from a wooden material and having a first uniform cross section outside the junction of the core and the at least one spoke, with the wooden member being mounted on the metal core to surround at least a part of the metal core;
   wherein the wooden member includes, at the junction of the core and the at least one spoke, an enlarged dimension relative to the uniform first cross section which extends in a radial direction toward the axis of rotation of the core.

2. The steering wheel according to claim 1, wherein the wooden member is disposed such that the grain thereof extends vertically with respect to a radial direction of the metal core.

3. The steering wheel according to claim 1, wherein the wooden members are disposed in a symmetrical manner relative to a vertical plane that extends through the center of the metal core in the longitudinal direction of the vehicle.

4. The steering wheel according to claim 1,
   wherein the wooden member comprises a plurality of elongated wooden pieces, the wooden pieces having a grain and being formed from a pure wooden material and bonded together to surround at least a part of the metal core when mounted on the metal core;
   wherein each of the wooden pieces is formed from a single pure wooden material, and the wooden pieces that are bonded together are formed from adjacent sites of the single pure wooden material, and
   wherein the grain of said wooden pieces forming said wooden member is oriented substantially along the longitudinal axes of said wooden pieces.

* * * * *